United States Patent [19]

Saunders et al.

[11] 4,011,176

[45] Mar. 8, 1977

[54] ELECTROCONDUCTIVE COATING COMPOSITION CONTAINING CATIONIC LATEXES

[75] Inventors: Frank L. Saunders; Donald A. Kangas; Ralph E. Friedrich, all of Midland, Mich.

[73] Assignee: The Dow Chemical Company, Midland, Mich.

[22] Filed: Jan. 31, 1975

[21] Appl. No.: 546,044

[52] U.S. Cl. .................................. 252/500; 96/1.5
[51] Int. Cl.² .......................................... H01B 1/04
[58] Field of Search ...................... 252/500; 96/1.5; 260/567.6 M

[56] References Cited

UNITED STATES PATENTS

| | | | |
|---|---|---|---|
| 3,619,284 | 11/1971 | Ray-Chaudhuri et al. | 428/342 |
| 3,798,032 | 3/1974 | Miller | 252/500 X |
| 3,819,656 | 6/1974 | Barie et al. | 260/567.6 M X |

OTHER PUBLICATIONS

"Formulated Conductive Coatings for Reprographic Papers" Dolinski et al., Designed Products Dept., Dow Chemical Co., Mar. 1971.

*Primary Examiner*—Benjamin R. Padgett
*Assistant Examiner*—E. Suzanne Parr
*Attorney, Agent, or Firm*—M. S. Jenkins; R. B. Ledlie

[57] ABSTRACT

A stable, aqueous composition comprising an electroconductive resin, e.g., poly (vinylbenzyl trimethyl ammonium chloride), and a latex of an organic polymer stabilized by cationic moiety is applied as a coating to a non-conductive substrate such as paper or a plastic film to provide an article having decreased surface electrical resistivity and increased resistance to organic solvents. Such compositions are particularly useful in the manufacture of electrographic printing papers.

10 Claims, No Drawings

ELECTROCONDUCTIVE COATING COMPOSITION CONTAINING CATIONIC LATEXES

BACKGROUND OF THE INVENTION

This invention relates to electroconductive coating compositions and to coated articles employing them.

In the manufacture of many articles employing nonconductive substrates as a component part of such articles, it is often desirable to reduce the surface electrical resistivity of the nonconductive substrate to a value below $10^{14}$ ohms at 10 percent relative humidity. For example, paper which has been rendered electroconductive may be used to distribute electrical stresses in various insulating products. Also, the support normally used in electrographic, electrophotographic, electrostatic and other nonimpact printing processes is conductive or is coated with a conductive layer, and as such plays a role in the formation of the image or the record.

In electrophotographic recording elements, a photoconductive layer stands in contact with an electroconductive layer or sheet, the latter being present to enable charging of the photoconductive layer and to dissipate the electrostatic charges from the areas of the photoconductive layer undergoing an exposure to light rays. As the photoconductive or photoresponsive material, there is most often used a specially treated zinc oxide coating. Where light strikes portions of the paper treated with such a light sensitive material, the electrical charge is dissipated in those areas exposed to light. As a result, there is left a pattern of charged and uncharged areas. The charged area will then be effective to attract an oppositely charged powder, or other usually particulated image forming material. Such a powder will not be attracted to the light affected discharge areas, and the powder may thus be deposited on the paper in a pattern which corresponds with the charged areas. Generally, such an image forming material may then be fused, or otherwise treated, on the paper to make the image permanent. Such an image forming material is often a wax coated finely divided carbon black which will fuse when heated on the paper.

While other nonimpact printing processes differ from the above in that the images are created by electrical dissipation of the static charge in nonimage areas, all require as a common characteristic an electrically conductive substrate such as an electroconductive paper.

Conventionally, paper and other nonconductive substrates have been rendered electroconductive by coating same with various electroconductive additives such as water-soluble quaternary ammonium polymers as exemplified in Silvernail et al., U.S. Pat. No. 3,011,918, Booth et al., U.S. Pat. No. 3,544,318, Cavagna et al., U.S. Pat. No. 3,479,215, and Rogers et al., U.S. Pat. No. 3,320,317.

In the production of electroconductive paper, the base substrate, i.e., the raw paper stock, is generally precoated with a composition of binder and pigment. Subsequently, the electroconductive resin is applied to the precoated paper, usually as an aqueous formulation of the resin, a pigment and oftentimes a binder. While the use of a binder is desirable and often necessary to provide coating strength and organic solvent resistance as well as a more economical material, the presence of the binder significantly reduces the electroconductivity of the resultant coating. Furthermore, some binders and electroconductive resins are so incompatible that stable coating compositions cannot be suitably prepared.

Therefore, it would be highly desirable to provide a stable electroconductive coating composition containing a significant amount of binder wherein the surface electrical resistivity and solvent resistance of the resultant coating are not materially impaired.

SUMMARY OF THE INVENTION

The present invention is, in one aspect, an aqueous coating composition comprising (1) a water-dispersible cationic electroconductive polymer in an amount sufficient to reduce the surface electrical resistivity of a non-conductive substrate having its surface coated with said composition to $10^{12}$ ohms or less at 10% relative humidity and (2) a latex of an organic polymer stabilized by a cationic surface active agent. The amount of latex employed is sufficient to enhance the solvent holdout and binding characteristic of the coating composition. However, the amount of latex is less than that amount which increases the surface electrical resistivity of a coated substrate to a value above $10^{12}$ ohms at 10% relative humidity.

In a second aspect, this invention is an electroconductive article having incorporated as an electroconductive additive the aforementioned composition in an amount effective to decrease the surface electrical resistivity of the article.

In a third aspect, the present invention is the aforementioned composition in the form of a coating adhered to a nonconductive substrate to provide an electroconductive substrate, for example, an electroconductive paper as described herein.

In addition to being useful as an electroconductive coating for paper, the compositions of the present invention are also useful as treating compositions for rendering textiles and other synthetic polymer articles antistatic, as electroconductive additives in other coating formulations such as carpet backing formulations, as an antistatic coating for television picture tubes and the like.

DETAILED DESCRIPTION OF THE EMBODIMENTS

Polymers suitable as the electroconductive component in the compositions of the present invention are those water-dispersible polymers having chemically bound to their backbone chains a sufficient number of pendant cationic moieties such as quaternary ammonium, pyridinium and imidazolinium and quaternary phosphonium and ternary sulfonium groups to render the polymer electroconductive, i.e., a volume electrical resistivity for the polymer which is less than $10^7$, preferably less than $10^5$, ohm centimeter at 17 percent relative humidity.

By water-dispersible is meant that the electroconductive polymer will disperse in water to form a stable aqueous colloidal dispersion or solution of the polymer. Also included are polymers which require the presence of surface active agents to be dispersed. Of the water-dispersible electroconductive polymers, the water-soluble ones are preferred.

Of the foregoing electroconductive polymers, polymers containing quaternary ammonium groups as the cationic moieties, e.g., as described by Dolinsky and Dean, *Chem. Tech*, 1, 304–309 (1971), are preferred. Examples of preferred polymers are the poly(vinylbenzylalkylammonium halide) resins used in Silvernail et al., U.S. Pat. No. 3,011,918 with the poly (diallyldimethylammonium chloride) resins of Booth et al., U.S. Pat. No. 3,544,318 and the quaternized polyepichlorohydrin of Rogers et al., U.S. Pat. No. 3,320,317, with the poly (vinylbenzylalkylammonium halide) resins being especially preferred. The concentration of cationic moieties in the polymer is not particularly critical so long as the minimum degree of electroconductivity is satisfied. The molecular weight of the polymer is similarly not critical; however higher molecular weight (i.e., >5000) polymers generally perform better than lower molecular weight.

Other suitable cationic electroconductive polymers include the quaternary phosphonium salts and ternary sulfonium salts of poly (vinylbenzyl chloride) and polyepihalohydrin and the like.

For the purposes of this invention, the latexes stabilized by a cationic surface active agent shall hereinafter be called "cationically stabilized latexes." Such latexes are further characterized as aqueous colloidal dispersions of a normally solid thermoplastic organic addition polymers wherein the polymer particles possess a positive charge that is generated by the action of the absorbed cationic surface active agent. This positive charge can be demonstrated electrophoretically as being attracted to the cathode of an electrolytic cell. The cationically stablized latexes are suitably prepared by subjecting known emulsion polymerizable monomers to emulsion polymerization conditions in the presence of cationic surface active agents. Examples of suitable emulsion polymerizable monomers are set forth in "Polymer Processes," edited by Calvin E. Schildknecht published (1956) by Interscience Publishers, Inc., New York, Chapter IV and "Emulsion Polymerization" by F. A. Bovey et al., published (1955) by Interscience Publishers, Inc. New York. Catalysts and catalyst activators, chain transfer agents, and procedural steps suitably employed here are also set forth in foregoing cited references of Schildknecht supra and Bovey et al., supra.

Of particular interest are latexes of polymers formed from such monomers as the vinylaromatic monomers, e.g., styrene, substituted styrenes such as ar-chlorostyrene and ar(t-butyl) styrene, d-methylstyrene, vinylnaphthalene and other monovinylidene carbocyclic aromatic monomers; conjugated dienes, e.g., butadiene and isoprene; esters of $\alpha,\beta$-ethylenically unsaturated carboxylic acids, e.g., alkyl acrylates and alkyl methacrylates; $\alpha,\beta$-ethylenically unsaturated nitriles, e.g., acrylonitrile; vinyl esters such as vinyl acetate and the other similar ethylenically unsaturated monomers. It is understood that both homopolymers and copolymers of the foregoing monomers are suitable. Especially preferred are latexes of polymers that are film forming at temperatures below those reached during the coating application and/or finishing of the coated substrate, e.g., styrene/butadiene copolymers, styrene/alkyl acrylate copolymers wherein alkyl has 1 to 12 carbon atoms, styrene/butadiene/acrylonitrile copolymers, styrene/butyl acrylate copolymers, styrene/butadiene/2-hydroxyethyl acrylate copolymers.

Cationic surface active agents suitably employed are organic compounds and low molecular weight polymers bearing a suitable number of (1) cationic groups such as ammonium (especially quaternary ammonium), amine hydrohalide, sulfonium, phosphonium, pyridinium, imidazolinium and/or (2) groups such as amino which exist as cationic groups under conditions normally employed in coating the non-conductive substrate, e.g., at pH below about 8. A suitable number of such cationic groups is that which imparts sufficient hydrophilic character to the agent to enable it to act as a surfactant or emulsifier for water-insoluble organic polymers such that the polymers are dispersed in water to form a stable aqueous colloidal dispersion. Accordingly, such cationic agents are most advantageously water-soluble.

Examples of suitable cationic agents are given in *McCutcheon's Detergents and Emulsifiers*, 1973 Annual. Of particular interest are the quaternary ammonium compounds such as N-higher alkyl trialkyl ammonium halides, especially the chlorides, wherein higher alkyl has from 8 to 20 carbon atoms and alkyl has from 1 to 4 carbons, N-vinylbenzyl trialkyl ammonium halides and the like. Of the foregoing quaternary ammonium compounds, the N-higher alkyl trimethyl ammonium chlorides wherein higher alkyl has from 10 to 14 carbon atoms and N-vinylbenzyl trimethyl ammonium chloride are especially preferred. Also preferred are amines such as the aminoalkyl esters of $\alpha,\beta$-ethylenically unsaturated carboxylic acids, e.g., the aminoalkyl acrylates and methacrylates such as 2-aminoethyl acrylate, 2- and 3-aminopropyl methacrylate and the like. It is further understood that low molecular weight (i.e., less than 2000 number average molecular weight as determined by gel permeation chromatography) polymers of the foregoing monomeric cationic compounds are also suitable cationic surface active agents.

In the aforementioned compositions, the electroconductive polymer preferably constitutes from about 15 to about 85, especially from about 25 to 70, dry weight parts and the cationically stabilized latex constitutes from about 85 to about 15, especially from about 70 to about 25, dry weight parts based on 100 dry weight parts of total composition. In the cationically stabilized latex, the cationic surface active agent is present in amounts from about 0.5 to about 6 weight percent based on the latex polymer, preferably from about 2 to about 4 weight percent.

In addition to the foregoing critical components, the composition of the present invention may contain other compatible additives, e.g., pigments including the inorganic varieties such as clay, calcium carbonate and titanium dioxides and plastic pigments such as described in U.S. Pat. No. 3,779,800 to Heiser, extenders, binders which enhance solvent resistance such as polyacrylamide, polyvinylalcohol and vinyl alcohol/vinyl acetate copolymers; thickeners such as sodium polyacrylate, buffer agents, pH adjusting agents, etc. While optimum formulations, which also contain one or more of these conventional additives, will depend on specific process and end use specifications, most pigmented formulations contain on a dry weight basis from about 30 to about 90 weight parts of the combined composition of electroconductive resin and cationically stabilized latex (i.e., from about 15 to about 45 dry weight parts of the electroconductive resin and from about 15 to about 45 dry weight parts of latex) and from about 70 to about 10 weight parts of the pigment per 100 dry weight parts of the formulation.

Also, the maximum total solids of the resulting pigmented aqueous formulation will, for such general procedures, range from about 30 to about 60 weight percent total solids in the formulation. In such formulations wherein a pigment is to be added, the pigment may be added separately to the formulation or as a mixture of binder and pigment to the other components of the formulation.

In the preparation of the electroconductive coated articles of the present invention, a nonconductive substrate (normally paper, but alternatively an organic polymer film, fiber or particulate) is coated by applying in a conventional manner the aqueous coating composition described hereinbefore.

For example, in the preparation of an electrostatographic printing paper, a paper substrate in the form of raw stock or a precoated paper is coated with the aqueous coating composition in an amount sufficient to reduce the surface electrical resistivity to the required level, e.g., from $10^9$ to $10^{11}$ ohms at 10 percent relative humidity. Typically a blade coater is used to apply the coating to the paper with a size press, roll coater or air knife being suitable alternative means. While for some applications it may be desirable to apply the coating to a single side of the paper, it is generally preferred to apply the coating to both sides of the paper to minimize toner deposition in nonimage areas and back printing. In the case of raw paper stock, the amount of coating composition + pigment applied to the paper is generally sufficient to provide a coat weight per side of about 1.5 to about 2.5 pounds per 3000 square feet of paper. In the case of precoated paper stock, only about 0.5 to about 1.5 pounds of the electroconductive coating is applied to one side of 3000 square feet of paper.

After drying, any one or more of the conventional photoconductive and/or dielectric coatings are applied in a conventional manner to produce the finished electrostatic paper. As an example, many photoconductive coatings or layers comprise a photoresponsive particulate material such as zinc oxide dispersed in a hydrocarbon solution of a non-conductive or dielectric binder, e.g., an oil-soluble styrene/butadiene copolymer. Since such photoconductive and/or dielectric coatings and the methods for employing them are common knowledge to those skilled in the art, they will not be more particularly described here.

The following examples further illustrate the present invention and should not be construed as limiting its scope. Unless otherwise stated, all parts and percentages are by weight.

EXAMPLES 1–6

Preparation of Cationically-Stabilized Latex

To a stirred 2 l. reaction vessel are charged the following ingredients:

| | Mixture A | Mixture B | Mixture C |
|---|---|---|---|
| Styrene | | | 297 |
| Butadiene | | | 243 |
| N-alkyl(~12 carbon) trimethyl ammonium chloride* | 3.23 | 18.36 | |
| Azo-bis(isobutyroamidiene hydrochloride | 0.54 | 2.70 | |
| Water | 440.3 | 194.94 | |

*Cationic surface active agent (50% active aqueous solution) sold by Armour Co. under tradename Arquad 12-50.

Mixture A is added initially in a batchwise fashion. Then Mixtures B and C are added continuously over periods of 6 and 5 hours, respectively, at a polymerization temperature of 90° C. The resulting latex has a pH of 5.6 and contains 44.4% polymer solids having particle size of 0.139 micrometers. The latex is subjected to steam distillation to remove unreacted monomer and to concentrate the latex to 44.8% polymer solids.

A coating formulation is prepared by adding 100 parts of 33.2% aqueous solution of poly(vinylbenzyl trimethyl ammonium chloride) prepared by the process of U.S. Pat. No. 3,607,989 to Sonnabend to 73.5 parts of the foregoing cationic latex. To this resulting dispersion is slowly added 66.6 parts of pigment (Hydrafine Clay). The combined pigment and dispersion are mixed in a Waring blender for 15 minutes, and an additional 8 parts of water is added.

A precoated base stock paper (Sheffield porosity of 3 for 1.5 inch diameter sample and basis weight of 46 lbs./3000 ft.$^2$) is coated on both sides with the resulting pigmented coating composition using a Time-Life bench coater. The precoating is primarily with a conventional starch binder. The coated sheet is dried, cut into 6 test strips, and conditioned for 12 hours in a room temperature glove box held at 10% relative humidity. The coated paper has a dried coated weight of 1.5 lb./3000 ft.$^2$/side. The surface electrical resistance (SER) and solvent holdout (SH) of each test strip are measured and the average of the results are recorded in Table I.

Following the general procedure of this Example 1, several other coating formulations are prepared and using different cationic latexes applied to paper substrates. The resulting coated papers are similarly tested for SER and SH, and the results are recorded in Table I.

Table I

| Ex. No. | Cationic Latex (1) | | | %Latex Solids | Latex pH | Log SER (2) | SH (3), 10 sec. | |
|---|---|---|---|---|---|---|---|---|
| | Polymer (a) | Surfactant (b) | | | | | Toluene | Isoparaffin |
| | | Type | Amount % | | | | | |
| 1 | S/B (55/45) | ATMAC | 2% | 44.8 | 7.3 | 9.49 | 5 | — |
| 2 | S/BA(55/45) | ATMAC | 2% | 44.8 | 5.6 | 9.93 | 2 | 10 |
| 3 | S/B (55/45) | VBTMAC | 3% | 49.7 | 5.6 | 9.89 | 10 | — |
| 4 | S/B/VCN (45/45/10) | ATMAC | 1.6% | 46.7 | 6.3 | 9.69 | 8 | — |
| 5 | S/B (70/30) | 2-AEM | 2.5% | 50.0 | 3.0 | 9.65 | 13 | 13 |
| 6 | S/B (65/35) | ATMAC | 3% | 47.2 | 5.5 | 9.64 | 3 | 8 |
| 7 | S/B/MAAM (50/45/5) | ATMAC | 1.0% | 46.2 | 5.2 | 9.93 | 8 | 10 |
| 8 | S/B (60/40) | ATMAC | 4.0% | 54.5 | 2.6 | 9.85 | 6 | 17 |
| 9 | S/B (55/45) | DDAA | 2.0% | 45.8 | 6.6 | 9.84 | 15 | 15 |
| 10 | S/B/HEA (50/45/5) | VBTMAC | 7.5% | 46.1 | 4.0 | 9.84 | 15 | 9 |
| 11 | S/BA (55/45) | ATMAC | 2.0% | 50.7 | — | 9.93 | 2 | 10 |

(1) Cationically stabilized latex having
(a) S-styrene, B-butadiene, VCN-acrylonitrile, BA-butyl acrylate, MAAM-N-(hydroxy-

Table I-continued

| Ex. No. | Cationic Latex (1) Polymer (a) | Surfactant (b) Type | Surfactant (b) Amount % | %Latex Solids | Latex pH | Log SER (2) | SH (3), 10 sec. Toluene | SH (3), 10 sec. Isoparaffin |
|---|---|---|---|---|---|---|---|---| methyl) acrylamide, HEA-2-hydroxyethyl acrylate numbers in ( ) indicate weight percent of given monomer.

(b) ATMAC—alkyltrimethylammonium chloride (Arquad 12–50), VBTMAC—vinylbenzyl-trimethyl ammonium chloride, 2-AEM—2-aminoethyl methacrylate, DDAA—dodecylamine acetate.

(2) Surface electrical resistivity (ohm) measure at 10% RH according to general procedure of ASTM D-257-66 using a Keithly Electrometer Model 16-B with a Model 6105 Resistivity Adaptor operating at 100 volts. Reported as Log of Ser.

(3) Solvent holdout (wire) measured usually by means of a solvent penetration test described by A. S. Diamond TAPPI, 48, 94a (October, 1965), using bromophenol blue as a solvent dye and a standard reference chart.

EXAMPLE 12

Following the general procedure of Example 1, several coating formulations are prepared using different proportions of the electroconductive resin (ECR), the cationic latex (latex) and the clay pigment (clay). The formulations are applied to a paper substrate, and the resulting coated papers are similarly tested for SER and SH. The results are recorded in Table II.

Table II

| Sample No. | Ingredients, dry parts ECR | Ingredients, dry parts Latex | Ingredients, dry parts Clay | Log SER (2) | SH (3), 10 sec. Toluene |
|---|---|---|---|---|---|
| 1 | 25 | 25 | 50 | 9.49 | 5 |
| 2 | 25 | 15 | 60 | 9.73 | 10 |
| 3 | 25 | 5 | 70 | 9.93 | 20 |

(2)-(3) Same as in Table I.

EXAMPLE 13

Using the coating formulation of Example 6, several coated papers are prepared at different coat weights. The resulting coated papers are tested for SER and SH, and the results are recorded in Table III.

TABLE III

| Sample No. | Coat Weight lb./3000 ft.$^2$/side | Log SER(2) | SH(3), 10 sec. % Toluene | SH(3), 10 sec. % Isopar |
|---|---|---|---|---|
| 1 | 0.75 | 9.67 | 4 | 20 |
| 2 | 1.0 | 9.65 | 4 | 12 |
| 3 | 1.25 | 9.67 | 3 | 10 |
| 4 | 1.5 | 9.64 | 3 | 8 |

(2)-(3) Same as in Table I.

EXAMPLE 14

Following the general procedure of Example 1 several coating formulations (Sample Nos. 1–4) are prepared using different electroconductive resins (ECR). The coating formulations are applied to both sides of precoated base paper having a Sheffield porosity of 37 for 1.5 in. diameter sample and a basis weight of 39 lbs./3000 ft.$^2$ to provide a dried coat weight of 1.5 lbs./3000 ft.$^2$/side. The resulting coated papers are tested for SER, and the results are recorded in Table IV.

For purposes of comparison, similar formulations (Sample Nos. $C_1$–$C_4$) are prepared using an anionically stabilized styrene/butadiene copolymer latex instead of the cationic latex of Example 1. The control formulations are similarly applied to paper and the control papers are tested for SER. The results are also recorded in Table IV.

TABLE IV

| Sample No. | ECR(1) | Log SER(2) |
|---|---|---|
| 1 | P(VBTMAC) | 9.44 |
| $C_1$* | P(VBTMAC) | 9.73 |
| 2 | Q-EPI(A) | 9.87 |
| $C_2$* | Q-EPI(A) | 10.12 |
| 3 | PDAMAC | 9.05 |
| $C_3$* | PDAMAC | 9.38 |
| 4 | Q-EPI(B) | 9.70 |
| $C_4$* | Q-EPI(B) | 9.94 |

*Not an example of the invention (1)P(VBTMAC)-poly(vinylbenzyltrimethylammonium chloride Q-EPI(A)-polyepichlorohydrin having a molecular weight of about 3000 and quaternized with tri-methylamine to a degree of 100 mole percent.

PDAMAC-poly(diallyl dimethyl-ammonium chloride) sold by Merck Chemical under the trade name Merck 261.

Q-EPI(B)-quaternized polyepichlorohydrin sold by Nalco Chemical under the trade name Nalco 61J16.

(2)Same as (2) in Table I.

As evidenced by the foregoing comparative data, formulations employing the cationically stabilized latex of the present invention exhibit significantly lower SER than do the coated papers employing anionically stabilized latexes.

EXAMPLE 15

The coated papers of Sample No. 1 and $C_1$ of Example 14 are tested for solvent resistance (SH) according to the method employed in Example 1. After 10 seconds, the coated paper of Sample No. 1 exhibits a 40% toluene penetration whereas the coated paper of Sample No. $C_1$ exhibits a 60% toluene penetration.

EXAMPLE 16

A coating formulation is prepared according to Example 1 except a styrene/butadiene (65/35) latex stabilized with 3% of alkyltrimethylammonium chloride is employed as the cationically stabilized latex.

The formulation is applied to both sides of precoated paper stock as in Example 1. The resultant coated paper is tested for SER and SH as in Example 1 and the results are recorded in Table V.

Illustrative of an especially preferred technique for improving SH of the coated papers, coating formulations prepared by the foregoing procedure are combined with different amounts of a plastic pigment. Coated papers prepared therefrom by the foregoing procedure are tested for SER and SH and the results are also recorded in Table V.

TABLE V

| Sample No. | Plastic Pigment(1) pph | Log SER(2) | SH(3), 10 sec. Toluene | SH(3), 10 sec. Isopar |
|---|---|---|---|---|
| 1 | 0 | 9.96 | 5 | 15 |
| 2 | 5 | 9.98 | 1 | 10 |

TABLE V-continued

| Sample No. | Plastic Pigment(1) pph | Log SER(2) | SH(3), 10 sec. Toluene | Isopar |
|---|---|---|---|---|
| 3 | 10 | 9.98 | 0 | 8 |

(1)A 49.3% polymer solids latex of styrene/acrylic acid (97/3) copolymer having an average particle diameter in the range from about 0.3 to about 0.8 micrometer in parts per 100 parts of the coating formulation of Sample No. 1 on a dry weight basis.
(2)-(3)Same as in Table I.

What we claim is:

1. An aqueous coating composition comprising (1) a water-dispersible cationic electroconductive polymer having chemically bound to its backbone a number of pendant cationic moieties such that the polymer has a volume resistivity less than $10^7$ ohm centimeters at 17% relative humidity and (2) a latex of a normally solid thermoplastic organic addition polymer containing an amount of a cationic surface active agent sufficient to stabilize the latex, said electroconductive polymer being present in an amount from about 15 to about 85 dry weight parts per 100 dry weight parts of the composition provided that said amount is such that the surface electrical resistivity of a non-conductive substrate having its surface coated with said composition is a value no greater than $10^{12}$ ohms at 10% relative humidity and said latex being present in an amount from about 15 to about 85 dry weight parts of per 100 dry weight parts of the composition provided said amount is sufficient to improve the solvent holdout properties of a coating of the composition in accordance with the solvent holdout method of A. S. Diamond, TAPPI, 48, 94a (10/65).

2. The aqueous composition of claim 1 which is a pigmented formulation comprising from about 15 to about 45 dry weight parts of the electroconductive resin, from about 15 to about 45 dry weight parts of the latex and from about 70 to about 10 dry weight parts of a pigment per 100 dry weight parts of the formulation.

3. The aqueous composition of claim 1 wherein the electroconductive polymer is a polymer bearing quaternary ammonium groups.

4. The aqueous composition of claim 3 wherein the electroconductive polymer is a polymer of vinylbenzyltrialkyl ammonium halide.

5. The aqueous composition of claim 3 wherein the latex is a latex of a styrene/butadiene copolymer stabilized with a cationic surface active agent having at least one quaternary ammonium group per molecule.

6. The aqueous composition of claim 5 wherein the cationic surface active agent is an N-alkyl trimethyl ammonium chloride.

7. An electroconductive coating of the composition of claim 1.

8. The aqueous composition of claim 1 wherein (1) the electroconductive polymer is a water-soluble polymer containing quaternary ammonium groups as cationic moities, (2) the latex is one wherein the polymer particles thereof possess a positive charge that is generated by the action of the absorbed cationic surface active agent and can be demonstrated electrophoretically as being attracted to the cathode of an electrolytic cell and (3) the cationic surface active agent is a water-soluble organic compound or a water-soluble polymer having a number average molecular weight less than 2000, said surface active agent bearing groups that are cationic at pH below 8 in a number sufficient to enable said agent to act as a stabilizing surfactant for the latex, said agent being present in an amount in the range from about 0.5 to about 6 weight percent based on the latex polymer.

9. The aqueous composition of claim 8 wherein (1) the electroconductive polymer is selected from the group consisting of poly(vinylbenzyl alkylammonium halide) resins, poly(diallyldimethylammonium chloride) resins, and quaternized polyepichlorohydrin, (2) the latex is a latex of a polymer of a monomer selected from the group consisting of monovinylidene carbocyclic aromatic, conjugated dienes, esters of $\alpha,\beta$-ethylenically unsaturated carboxylic acids, $\alpha,\beta$-ethylenically unsaturated nitriles, and vinyl esters and (3) the cationic surface active agent is selected from the group consisting of (a) N-higher alkyl trialkylammonium halides wherein higher alkyl has from 8 to 20 carbons and alkyl has from 1 to 4 carbons, N-vinylbenzyl trialkylammonium halides and polymers thereof, and aminoalkyl esters of $\alpha,\beta$-ethylenically unsaturated carboxylic acids and polymers thereof.

10. The aqueous compositions of claim 9 wherein the cationic surface active agent is present in an amount in the range from about 2 to about 4 weight percent based on the latex polymer.

* * * * *